April 11, 1944.　　　E. D. BAILEY ET AL　　　2,346,247
OPTICAL APPARATUS
Filed May 28, 1941
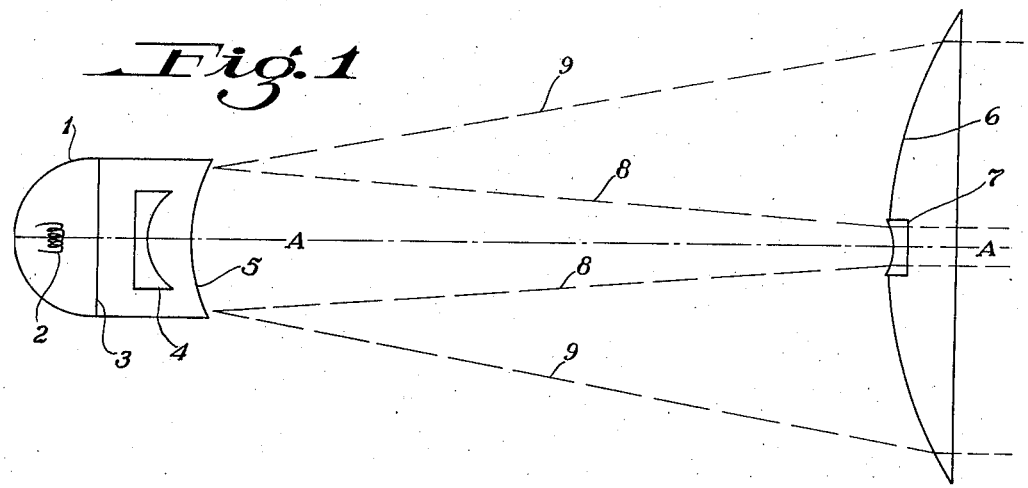
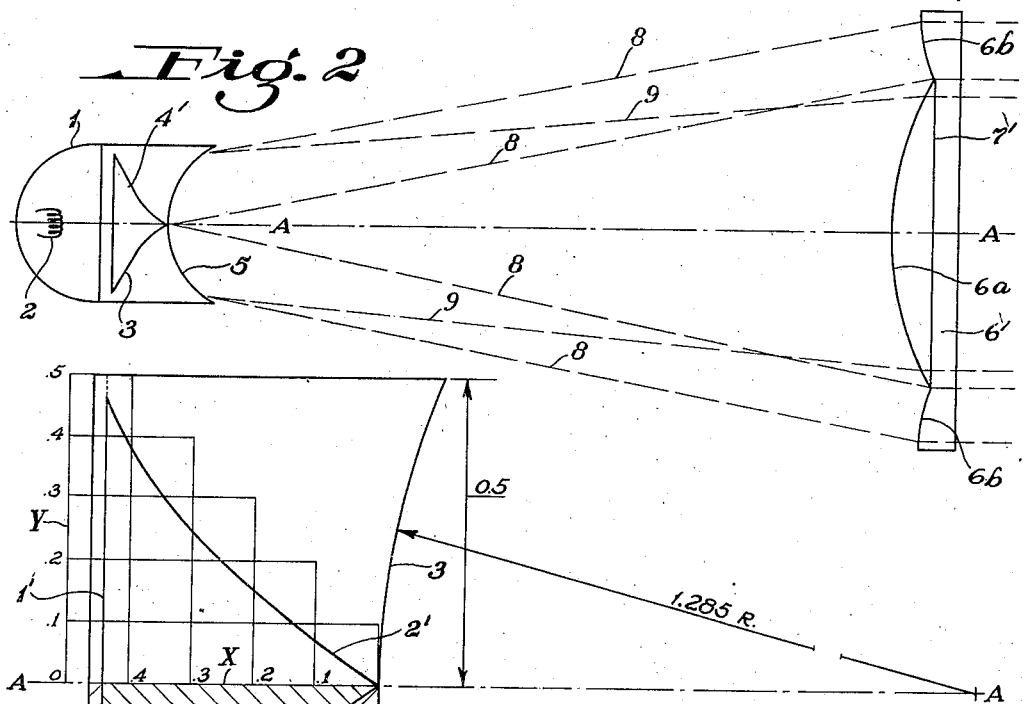
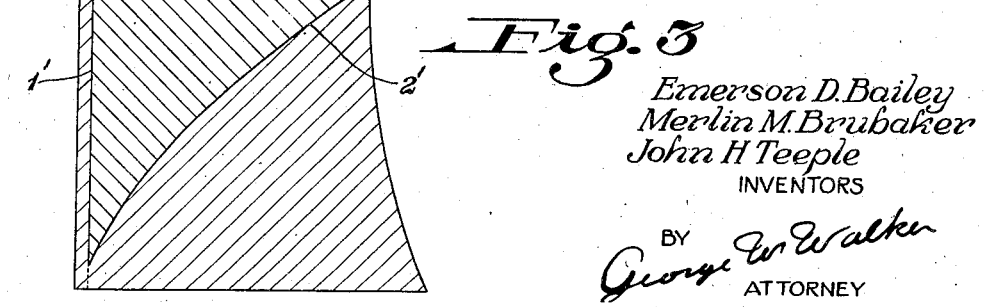
Emerson D. Bailey
Merlin M. Brubaker
John H Teeple
INVENTORS
BY George W Walker
ATTORNEY Patented Apr. 11, 1944

2,346,247

UNITED STATES PATENT OFFICE 2,346,247

OPTICAL APPARATUS

Emerson D. Bailey, Wilmington, Del., Merlin M. Brubaker, Boothwyn, Pa., and John E. Teeple, Caldwell, N. J., assignors to E. I. du Pont de Nemours & Company, Wilmington, Del., a corporation of Delaware Application May 28, 1941, Serial No. 395,552

12 Claims. (Cl. 88—65)

This invention pertains to an optical device for rendering plane polarized virtually all of the natural light incident on it.

Methods for producing polarized light have assumed commercial significance in recent years due to the fact that polarized lighting systems are under consideration for automobiles. One of the obstacles to the adoption of such systems is the low efficiency of the polarizing devices so far developed. The present commercial systems use the absorption type of polarizing screens which can transmit at the maximum fifty percent (50%) of the incident light.

It is an object of this invention to produce a polarizing device that will give a high overall efficiency in polarizing all available light. Another object is to provide a simple and direct means for polarizing a collimated beam into two beams which pursue different courses but which are both symmetrically distributed with respect to a common linear axis. Another object is to provide a new and improved headlight for an automobile. Other objects will be apparent from the following description of the invention.

These objects are accomplished by the invention described herein. In the present polarizing device a shaped macroscopic object such as a lens or prism formed from a birefringent crystal is embedded in an isotropic medium whose refractive index is such that the algebraic differences in refractive index between said medium and any two indices of the crystal are not identical. Preferably, the refractive index of the isotropic medium either substantially matches one of the crystal indices or falls between two of the crystal indices, and, in the most useful aspect of the invention, the index of the isotropic medium substantially matches one of the indices of the crystal. The shape of the crystal and the isotropic medium are made so that the emerging ordinary and extraordinary beams pursue different courses, but so that both beams are symmetrically distributed with respect to the optic axis of the polarizing system. After the separation, the beams are parallelized by an isotropic lens system and the plane of polarization of one of the beams is rotated 90° by means of a half-way plate or film.

In one embodiment of this invention, a plano-concave lens of a birefringent crystal is embedded in an isotropic solid medium. The embedding medium is chosen so that the refractive index of the medium is the same as the higher index of the crystal. The crystal is cut so that in the case of a uniaxial crystal the optic axis of the crystal is normal to the optic axis of the lens and parallel to the plane face of the lens, or in the case of biaxial crystals the optic plane which contains both optic axes is parallel to the plane face of the crystalline lens. The center of curvature of the concave face lies on the optic axis. The plane faces of the embedding medium are both normal to the optic axis of the lens. Parallel natural light incident on the plane face of the crystal is divided into two beams of equal intensity, the first passes unchanged and remains parallel the second is brought to a focus by the birefringent lens, re-parallelized by an isotropic lens and rotated by a half-wave plate.

In another embodiment of the invention a plano-cylindrical lens formed from a birefringent crystal is embedded in an isotropic solid whose refractive index matches one of the indices of the crystal. The axis of the cylinder is parallel to the plane face, and the optic axis of the crystal in the case of uniaxial crystals parallel to the plane face, or the optic plane parallel to the plane face in the case of biaxial crystals. The entrance and exit faces of the isotropic medium are plane and paralleled to the plane face of the crystal. Parallel natural light incident on the plane face of the crystal is divided into two beams one of which passes through the system unchanged while the other is brought to a focus symmetrical about an axis parallel to the crystal axis. The focused light is parallelized by an isotropic cylindrical lens and rotated by means of a half-wave plate.

In yet another modification of the invention, and the modification that is preferred, a birefringent crystal is used, with a shape given by revolving a plane closed figure formed by two straight lines meeting in a right angle and a curved line, about one of the straight sides. The axis of revolution forms the optic axis of the lens and is normal to the plane containing the optic axis of the crystal in the case uniaxial crystals and normal to optic plane containing both optic axes in the case of biaxial crystals. The crystalline lens is embedded in an isotropic medium whose refractive index matches one of the indices of the crystal and whose shape is complementary to that of the crystal. The entrance face of the isotropic medium is a plane, normal to the axis of the revolution of the crystal. The exit face of the isotropic medium has a spherical curvature convex toward the entrance face, the center of curvature lies on the axis of revolution of the crystal. Parallel natural light passing through this system is divided into two divergent beams polarized in mutually perpendicular planes. These two beams are completely separated at a point determined by the curvature of the exit face of the crystal and embedding medium. One of the beams forms a circular pattern and the other an annular ring whose inner circumference coincides with the outer circumference of the first beam. The system is completed by a lens with the proper shape to parallelize both beams and a half wave length plate or film to rotate the plane of polarization of the first beam through 90° after it has been made parallel.

The analytical expression for the doubly refracting lens shape of Figure 3 is $y=Mx+Nx^2$, where M and N are constant coefficients for any particular case. It can be shown, for sodium nitrate and the particular set of geometrical conditions of Figure 3, that $y=0.4x+1.306x^2$. In the above formulas, $x$ is the distance from the intersection of the parabolic surface with the optic axis measured along the optic axis toward the entrance face; $y$ is the distance from the optic axis to the parabolic surface normal to the optic axis. In this particular case, the distances are in centimeters. M and N will change as the relative positions of the doubly refracting and isotropic lens elements are moved relative to one another; they will change as the refractive indices of the crystal are varied; they will change as the position of the headlight lens is moved with respect to the polarizing lens element; and they will change as the size of the headlight lens is varied. In Figures 2 and 3, the exit face of the doubly refracting element is a semiparabola of revolution.

The preferred device (that of Figures 2 and 3) is, therefore, a light polarizing device comprising a lens-shaped birefringent crystal with a plane entrance face and an exit face which is a semiparabola of revolution embedded in an isotropic medium whose refractive index is such that the algebraic differences in refractive index between said medium and any two indices of the crystal are not identical. The form of the parabolic surface depends on the refractive indices of the birefringent crystal, the refractive index of the isotropic medium, and the relative positions of the birefringent crystal and the isotropic medium with respect to one another and with respect to the source of illumination and the plane to be illuminated on the exit side of the polarizing element. The isotropic medium surrounding the birefringent lens has a plane entrance face and spherical exit face, convex toward the entrance face.

In Figure 1, another embodiment is shown in which all the above recited conditions are the same except that the exit face of the birefringent crystal is spherical, and its radius of curvature depends on the same factors which condition the form of the parabolic surface in the embodiment of Figures 2 and 3.

In all of the above systems the natural light can be converted to circularly polarized light in which both components have the same sense of rotation if properly oriented quarter wave plates or films are used in each beam instead of placing a half-wave plate or film in one beam.

The invention may be better understood by considering the fact that when natural light enters a doubly refracting crystal it is resolved into plane polarized components and these components will in general have different velocities of propagation in the crystal. The simplest case of a birefringent crystal is the uniaxial crystal. In this type of crystal the refractive index for light whose plane of polarization is parallel to the crystal axis is different from that for the light whose vibrations are in the plane normal to the principal crystal axis. The light whose vibrations are parallel to the principal crystal axis forms the extraordinary ray, while the light whose vibrations are resolved normal to the principal crystal axis forms the ordinary ray. The ordinary ray obeys the laws of refraction developed for isotropic materials, the extraordinary ray in general does not. However, if a parallel beam of light is incident normally on a plane face of uniaxial crystal so cut that this face is parallel to the optic axis or is incident on a plane face of a biaxial crystal so cut that the plane face is parallel to the optic plane, both polarized components are undeviated on entering the crystal and proceed with different velocities on identical paths. The refraction which occurs as the light passes from the crystal to the isotropic media may be calculated according to the usual laws for isotropic media.

If a prism, lens, or similar body to modify the path of a beam of light is cut from a birefringent crystal so that the crystal axis bears the proper relation to the crystal faces and embedded in an isotropic solid which matches one of the indices of the crystal, light polarized in one plane will act as if the system were isotropic and be unaffected, whereas the light polarized in the other plane will be refracted in a manner determined by the shape of crystal. In cases where it is possible to match the index of the extraordinary ray the crystal may be cut in the easiest way which will modify the beam as desired. More frequently, however, it will be necessary to refract the extraordinary ray and where this is necessary the shape of the crystal should be such that the refraction occurs as the light leaves the crystal and passes into the isotropic material. When this construction is used the separated polarized components will both be transmitted through the birefringent material as coinciding parallel beams differing only in velocity of propagation. Since the velocity of propagation of the ordinary ray in the crystal and in the surrounding medium are the same, no change in direction is caused by its passing the crystal boundary. The extraordinary ray does undergo a change in velocity at the crystal boundary and the consequent change in direction which takes place at the exit face of the crystal is determined by the shape of the exit face of the crystal and the refractive indices of crystal and medium. The entrance faces of the isotropic medium and the crystal will usually be plane and parallel to each other, and normal to the direction of propagation of the incident light. The exit face of the isotropic medium will in general be convex toward the source filling the exit lens of the headlight with light and at the same time keeping the dimensions of the birefringent crystal small.

The shape of the exit lens of the headlight will be designed to parallelize both components coming from the polarizing system. After the beam has been made parallel a half-wave plate or film is placed in the path of one of the components and properly oriented to rotate the plane of polarization of this component through 90°. All of the parallel light incident on the polarizing system is now parallel and both components are polarized in the same plane. The half-wave film is preferably laminated between a two-element exit lens. The half-wave film or plate can be prepared in any desired manner, such as from mica, crystal quartz, doubly refracting plastic film or the superpolymer film described in the copending application of Bailey Ser. #309,079, filed December 13, 1939.

The light incident on the polarizing system is preferably parallel. Parallel light can be obtained from an incandescent source placed at the focus of reflector whose inner surface has the shape of a paraboloid of revolution. This will differ from systems now in use only in the dimensions of the paraboloid. The present reflector and filament must be much smaller in order that all of the reflected light shall pass through the entrance face of the polarizing system.

Table I lists several doubly refracting crystals whose optical properties are suitable for use in the polarizing system described above. Sodium nitrate is the preferred crystal from this series because of its high double refraction, its relatively high melting point, and because large synthetic crystals of this material are now being made commercially. The isotropic embedding medium for the polarizing system could be prepared from any one of a number of plastic materials. It is preferable, however, to make it from a glass because of the high temperature which the polarizing system will have to withstand. Light flint glass has a refractive index which almost exactly corresponds with the index of sodium nitrate for the ordinary ray. The dispersion of the embedding medium should be adjusted so that the refractive index for the extraordinary ray of the crystal relative to the medium is substantially constant throughout the visible spectrum. The glass can be molded, the fit between crystal being preferably loose. The space between glass and crystal can then be filled with a high-boiling, heat-stable liquid of the same index as the glass. This liquid layer separating crystal and glass will protect the components from strains caused by differential thermal expansion coefficients.

In Figure 1 one modification of the invention is shown, 1 is a parabolic reflector, 2 is an incandescent filament, 3 is the isotropic embedding medium, 4 is the birefringent crystal, 5 is the curved exit surface of the isotropic medium, 6 is the headlight lens to unite both polarized components in a coherent beam, and 7 is the half-wave film to rotate the plane of polarization of the focused extraordinary beam. The plane containing the optic axis (uniaxial) or the optic plane (biaxial) in the crystal 4 is normal to the plane of the paper.

Figure 2 shows the preferred embodiment of the invention, 1 is a parabolic reflector, 2 is an incandescent filament, 3 is the isotropic embedding medium, 4' is the birefringent crystal, 5 is the curved surface of the exit face of the embedding medium, 6' is the headlight lens properly shaped to make both components parallel, 7' is a half-wave plate or film to rotate the ordinary beam in the center.

Figure 3 gives a magnified diagram of the birefringent crystal of Figure 2; 1' is the plane face which receives the incident light. The optic axis in the case of a uniaxial crystal lies in this plane. The plane is parallel to the optic plane in the case of biaxial crystals; 2' is the curve determined to refract the extraordinary ray as shown in Figure 2. In Figures 1 and 2 the dash lines numbered 8 are the extreme extraordinary ray and the dash lines numbered 9 are the extreme ordinary ray. A specific illustration of the example is given in the example immediately following.

*Example*

A piece of optically clear sodium nitrate crystallized from a melt is ground to a circular cylinder such that the optic axis of the crystal is parallel to the plane ends and normal to the sides of the cylinder. The diameter of the cylinder is 1 inch and the length 0.500 inch. The exit face is ground with a grinder whose shape is complementary to that obtained by rotating 2 Figure 3 about axis AA. The shape of the exit face of the birefringent crystal is given by the coordinate system of Figure 3. For the present example the dimensions are in inches. The parallelizing lens is 6" from the glass exit face 3 at the center line AA. The crystal and glass parts are shown by the cross hatching in the lower part of Figure 3.

The embedding medium is light flint glass and is prepared by molding in a form in the two sections indicated in Figure 2. The space between the crystal and medium is filled with a mixture of Aroclor and mineral oil which has the same refractive index as the glass. The headlight lens 6' is molded in two parts 6A and 6B. Film 7' is half-wave for green radiation and is laminated between 6A and 6B with the film axis making an angle of 45° with optic axis of the crystal of Figure 2. When the filament 2 is energized substantially all of the light is plane polarized and the plane of polarization is the same for light from the central disk as for the light from annular ring surrounding the central disk. To test the efficiency of the device, an isotropic plano-concave lens is formed identical with polarizing system except that the space formerly occupied by the crystal is now glass. The light is now emitted entirely from the central disk. It is found that 95% as much energy is transmitted through lens 6' with the polarizing system as with the isotropic analogue.

While the invention has been described with special reference to automobile headlights and a diverging lens is used on the exit face of the isotropic medium, it is evident that for special uses the exit face may be plane or even convex. Furthermore, while the system has been illustrated particularly for the case where the incident light is parallel, it is obvious that the device can be adapted to the case of converging or diverging incident light by making the entrance face of the isotropic concave or convex toward the source.

While in the preferred embodiment of the system for use in automobile headlights glass is used for the isotropic embedding medium, in cases where little heat is developed thermoplastic resins and other plastic material may be used to advantage. Table I lists a number of crystals which would serve for the polarizing element.

The system described herein is of particular use in polarized automobile headlights. Polarized headlights are valuable because a driver equipped with polarizing glasses will be almost completely relieved from the headlight glare from an approaching car. The efficiency of the systems so far proposed has been too low to permit their adoption. Moreover most of the devices which are at all practical consist of a finely divided polarizing agent in a plastic film. In most of these films it is doubtful whether the stability toward heat and light is sufficient to give satisfactory service. The present system utilizes a very high fraction of the light developed by the source. Moreover, the materials of construction are stable to heat and light. In addition, the device is far simpler than any previous device using either double refraction or reflection to polarize the light.

In addition to the use in automobile headlights the present system is admirably adapted for use in motion picture projectors for polarized stereoscopic motion pictures. It could also be used to advantage in advertising and other displays requiring polarized light.

The following table lists the preferred double refracting crystal and substances which may be used to make the lens shaped crystal. The table indicates the refractive indices of these substances.

Table

|  |  |  |  | Ratio of high to low index |
|---|---|---|---|---|
| UNIAXIAL CRYSTALS | | | | |
| Sodium nitrate | 1.587 | 1.336 |  | 1.189 |
| Calcite | 1.658 | 1.486 |  | 1.068 |
| Lithium nitrate | 1.735 | 1.435 |  | 1.209 |
| BIAXIAL CRYSTALS | | | | |
| K nitroanilate | 1.473 | 1.473 | 1.668 | 1.131 |
| Potassium nitrate | 1.335 | 1.335 | 1.506 | 1.127 |
| Diphenyl maleic anhydride | 1.511 | 1.512 | 1.836 | 1.211 |
| Dicyandiamide | 1.521 | 1.549 | 1.347 | 1.202 |
| Ca fumarate. 2H$_2$O | 1.602 | 1.611 | 1.413 | 1.137 |
| Urea oxalate | 1.612 | 1.617 | 1.389 | 1.162 |
| Styryl p-toluyl ketone, C$_6$H$_5$—CH=CH—CO—C$_6$H$_4$—CH$_3$ | 1.621 | 1.617 | 1.389 | 1.165 |
| Urea nitrate | 1.647 | 1.654 | 1.375 | 1.200 |
| NaH phthalate | 1.661 | 1.668 | 1.485 | 1.120 |

Most of the emphasis has been placed on the production of plane polarized light. All of the incident natural light can equally easily be converted to circularly polarized light by placing quarter wave plates in the paths of the separated beams, the fast axes of the two quarter wave plates will be normal to each other.

In some devices which utilize a high fraction of the incident light, about half of the light emitted is widely diffused and largely useless. In the present system virtually all of the light is converted to polarized light and all of the polarized light is emitted in a coherent beam.

As many apparently widely different embodiments of this invention may be made without departing from the spirit and scope thereof, it is to be understood that we do not limit ourselves to the specific embodiments thereof except as defined in the appended patent claims.

We claim:

1. In a light polarizing device, a lens-shaped bi-refringent crystal with a plane entrance face normal to the optic axis of said device and an exit face having a surface of revolution concave in the exit direction, the axis of revolution coinciding with said optic axis, said crystal being completely embedded in a lens-shaped isotropic medium having a plane entrance face parallel to the plane entrance face of said crystal and an exit face having a spherical surface concave in the exit direction, the center of said spherical surface being on said optic axis, and said medium having a refractive index falling within the range of the refractive indices of said crystal.

2. In a light polarizing device, a lens-shaped bi-refringent crystal with a plane entrance face normal to the optic axis of said device and an exit face which is a semi-parabola of revolution concave in the exit direction, the axis of revolution coinciding with the optic axis, said crystal being completely embedded in a lens-shaped isotropic medium having a plane entrance face parallel to the plane entrance face of said crystal, and an exit face having a spherical surface concave in the exit direction, the center of said spherical surface being on said optic axis, and said medium having a refractive index falling within the range of refractive indices of said crystal.

3. In a light polarizing device, a lens-shaped bi-refringent crystal with a plane entrance face normal to the optic axis of said device and an exit face having a spherical surface concave in the exit direction, the center of said spherical surface being on said optic axis, said crystal being completely embedded in a lens-shaped isotropic medium having a plane entrance face parallel to the plane entrance face of said crystal, and an exit face having a spherical surface concave in the exit direction, the center of said spherical surface being on said optic axis, and said medium having a refractive index falling within the range of refractive indices of said crystal.

4. In a light polarizing device, a lens-shaped bi-refringent crystal with a plane entrance face normal to the optic axis of said device and an exit face having a surface of revolution concave in the exit direction, the axis of revolution coinciding with said optic axis, said crystal being completely embedded in a lens-shaped isotropic medium having a plane entrance face parallel to the plane entrance face of said crystal and an exit face having a spherical surface concave in the exit direction, the center of said spherical surface being on said optic axis, and said medium having a refractive index which substantially matches one of the indices of said crystal.

5. In a light polarizing device, a lens-shaped bi-refringent crystal with a plane entrance face normal to the optic axis of said device and an exit face which is a semi-parabola of revolution concave in the exit direction, the axis of revolution coinciding with the optic axis, said crystal being completely embedded in a lens-shaped isotropic medium having a plane entrance face parallel to the plane entrance face of said crystal, and an exit face having a spherical surface concave in the exit direction, the center of said spherical surface being on said optic axis, and said medium having a refractive index which substantially matches one of the indices of said crystal.

6. In a light polarizing device, a lens-shaped bi-refringent crystal with a plane entrance face normal to the optic axis of said device and an exit face having a spherical surface concave in the exit direction, the center of said spherical surface being on said optic axis, said crystal being completely embedded in a lens-shaped isotropic medium having a plane entrance face parallel to the plane entrance face of said crystal, and an exit face having a spherical surface concave in the exit direction, the center of said spherical surface being on said optic axis, and said medium having a refractive index which substantially matches one of the indices of said crystal.

7. In combination, a light source producing chiefly a collimated beam and a polarizing device, the axis of said beam and the axis of said polarizing device coinciding, said polarizing device comprising a lens-shaped birefringent crystal with a plane entrance face normal to the optic axis of said device and an exit face having a surface of revolution concave in the exit direction, the axis of revolution coinciding with said optic axis, said crystal being completely embedded in a lens-shaped isotropic medium having a plane entrance face parallel to the plane entrance face of said crystal and an exit face having a spherical surface concave in the exit direction, the center of said spherical surface being on said optic axis, and said medium having a refractive index falling within the range of the refractive indices of said crystal.

8. In combination, a light source producing chiefly a collimated beam and a polarizing device, the axis of said beam and the axis of said polarizing device coinciding, said polarizing device comprising a lens-shaped birefringent crystal with a plane entrance face normal to the optic axis of said device and an exit face which is a semi-parabola of revolution concave in the exit direction, the axis of revolution coinciding with the optic axis, said crystal being completely embedded in a lens-shaped isotropic medium having a plane entrance face parallel to the plane entrance face of said crystal, and an exit face having a spherical surface concave in the exit direction, the center of said spherical surface being on said optic axis, and said medium having a refractive index falling within the range of refractive indices of said crystal.

9. In combination, a light source producing chiefly a collimated beam and a polarizing device, the axis of said beam and the axis of said polarizing device coinciding, said polarizing device comprising a lens-shaped birefringent crystal with a plane entrance face normal to the optic axis of said device and an exit face having a spherical surface concave in the exit direction, the center of said spherical surface being on said optic axis, said crystal being completely embedded in a lens-shaped isotropic medium having a plane entrance face parallel to the plane entrance face of said crystal, and an exit face having a spherical surface concave in the exit direction, the center of said spherical surface being on said optic axis, and said medium having a refractive index falling within the range of refractive indices of said crystal.

10. In an automobile headlight, a light source producing chiefly a collimated beam which passes through a polarizing device in a direction coinciding with the optic axis of said device, said device producing ordinary and extraordinary beams which pursue different courses and are symmetrically distributed with respect to the optical axis of said device, said device comprising a lens-shaped birefringent crystal with a plane entrance face normal to the optic axis of said device and an exit face having a surface of revolution concave in the exit direction, the axis of revolution coinciding with said optic axis, said crystal being completely embedded in a lens-shaped isotropic medium having a plane entrance face parallel to the plane entrance face of said crystal and an exit face having a spherical surface concave in the exit direction, the center of said spherical surface being on said optic axis, and said medium having a refractive index falling within the range of the refractive indices of said crystal, and a half-wavelength plate placed in the path of one of the symmetrically distributed beams and an exit lens for said headlight shaped so as to substantially parallelize both of the beams coming from the polarizing system.

11. In an automobile headlight, a light source producing chiefly a collimated beam which passes through a polarizing device in a direction coinciding with the optic axis of said device, said device producing ordinary and extraordinary beams which pursue different courses and are symmetrically distributed with respect to the optical axis of said device, said device comprising a lens-shaped birefringent crystal with a plane entrance face normal to the optic axis of said device and an exit face which is a semi-parabola of revolution concave in the exit direction, the axis of revolution coinciding with the optic axis, said crystal being completely embedded in a lens-shaped isotropic medium having a plane entrance face parallel to the plane entrance face of said crystal, and an exit face having a spherical surface concave in the exit direction, the center of said spherical surface being on said optic axis, and said medium having a refractive index falling within the range of refractive indices of said crystal, and a half-wavelength plate placed in the path of one of the symmetrically distributed beams and an exit lens for said headlight shaped so as to substantially parallelize both of the beams coming from the polarizing system.

12. In an automobile headlight, a light source producing chiefly a collimated beam which passes through a polarizing device in a direction coinciding with the optic axis of said device, said device producing ordinary and extraordinary beams which pursue different courses and are symmetrically distributed with respect to the optical axis of said device, said device comprising a lens-shaped birefringent crystal with a plane entrance face normal to the optic axis of said device and an exit face having a spherical surface concave in the exit direction, the center of said spherical surface being on said optic axis, said crystal being completely embedded in a lens-shaped isotropic medium having a plane entrance face parallel to the plane entrance face of said crystal, and an exit face having a spherical surface concave in the exit direction, the center of said spherical surface being on said optic axis, and said medium having a refractive index falling within the range of refractive indices of said crystal, and a half-wavelength plate placed in the path of one of the symmetrically distributed beams and an exit lens for said headlight shaped so as to substantially parallelize both of the beams coming from the polarizing system.

EMERSON D. BAILEY.
MERLIN M. BRUBAKER.
JOHN H. TEEPLE.